Jan. 30, 1923.

C. A. OLCOTT.
BEARING.
FILED JAN. 31, 1920.

1,443,884

INVENTOR
CHARLES A. OLCOTT
BY
Howson and Howson
ATTORNEYS

Patented Jan. 30, 1923.

1,443,884

UNITED STATES PATENT OFFICE.

CHARLES A. OLCOTT, OF NEW YORK, N. Y., ASSIGNOR TO S. S. HEPWORTH COMPANY, OF NEW YORK, N. Y., A CORPORATION OF NEW YORK.

BEARING.

Application filed January 31, 1920. Serial No. 355,450.

*To all whom it may concern:*

Be it known that I, CHARLES A. OLCOTT, a citizen of the United States of America, residing in the city, county, and State of New York, have invented certain new and useful Improvements in Bearings, of which the following is a specification.

My invention relates to bearings and particularly to bearings for centrifuges, the object of my invention being to provide a bearing of such improved construction that while the spindle of the centrifuge has limited freedom of angular displacement therein, and the bearing itself has limited freedom of lateral displacement, the latter is automatically braked and thus tends to maintain the spindle more nearly in its proper vertical position.

In the accompanying drawing—

Figure 1:
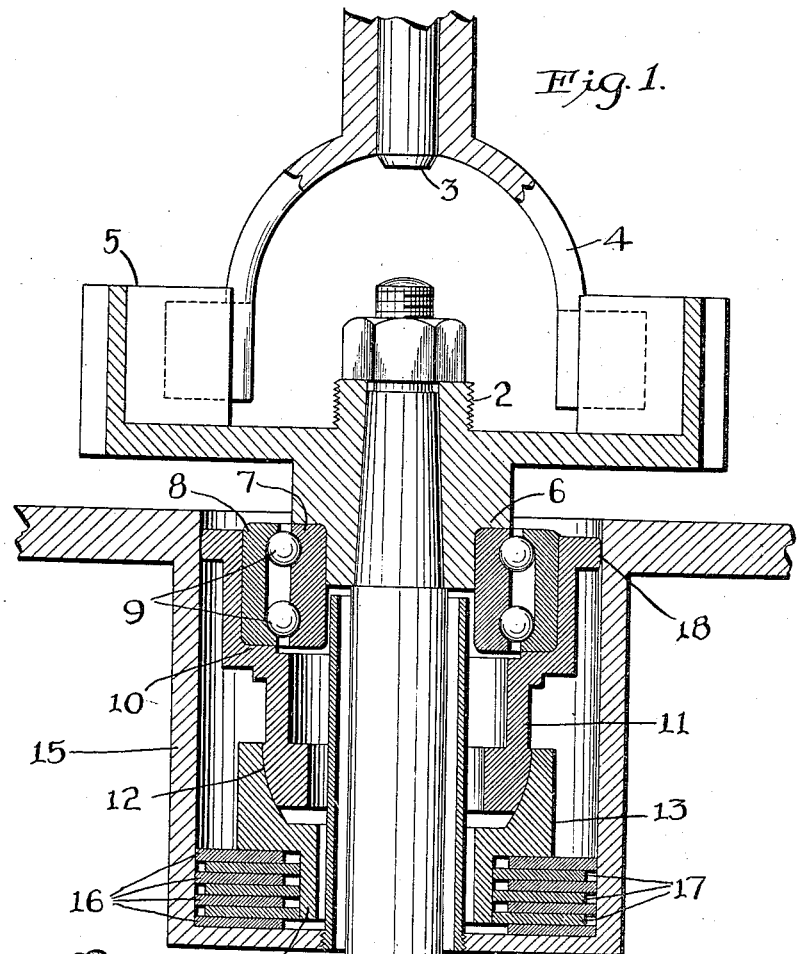
Figure 2:
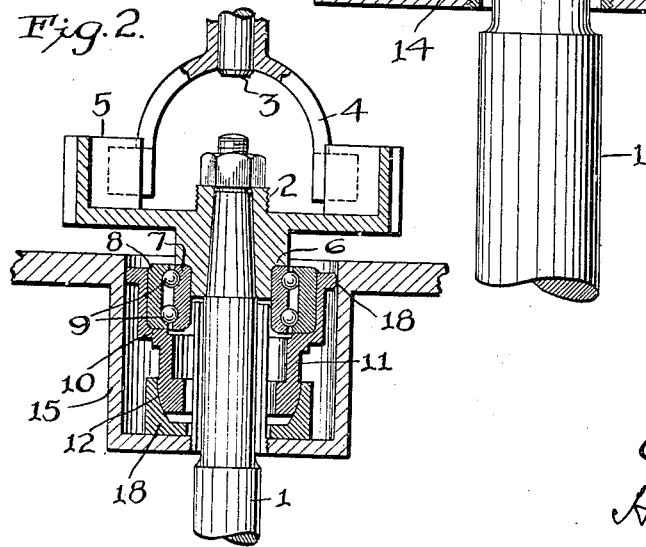

Fig. 1 is a vertical section through a bearing in which my invention is embodied in one form; and Fig. 2 is a partial section through a modified construction.

The construction illustrated resembles in certain respects that of the Mackintosh Patent No. 1,321,787, upon which it is an improvement.

The vertical spindle 1 of the centrifugal is fast at its upper end with its driving hub 2, while the latter is rotated from the motor spindle 3 through the fork 4, the legs of which freely engage between lugs 5 on the hub 2. Seated against the shoulder 6 of the hub is the ball-bearing ring 7, which rotates therewith, while the cooperating ring 8, spaced by the balls 9 therefrom, is supported on a shoulder 10 in the non-rotating cup 11. The lower portion of the latter is rounded at 12 to form a ball joint with the cooperating socket 13 in which it is seated.

This socket is provided at its inner margin with a downwardly extending neck 14, which forms, with the lower portion of the rigid supporting casing 15, a friction brake chamber. Within this chamber are two series of washers 16 and 17. The washers 17 fit upon the neck 14 of the socket but have an over-all diameter less than that of the friction chamber; while the washers 16 of the other series have an over-all diameter corresponding to that of the friction chamber, but an internal diameter greater than that of the neck 14. Thus, while the washers 16 are held against lateral displacement within the friction chamber, the washers 17 are capable of limited lateral displacement with the socket 13. The latter, upon which the weight of the spindle and associated parts is imposed through the bearing cup 11, rests upon the pile of alternating washers 16, 17, and thus transmits therethrough to the rigid casing element 15 the entire weight of the centrifugal.

It will be further noted that the cup 11 has at its upper margin a ring flange 18, slightly rounded on its outer face, and fitting closely within the upper portion of the casing 15. When the spindle 1 of the centrifugal tends to swing, due to an unbalanced load, the ring 18 forms the axis on which the spindle tilts.

The operation is as follows: When the spindle 1 tilts on the axis of the ring 18, the cup 11 rocks on its ball joint with the socket 13. At the same time the tilting movement tends to shift the socket 13 laterally. This lateral displacement of the socket 13 is opposed, however, not only by its frictional engagement with the top washer 16, but by the similar frictional engagement of the several washers 17 moving therewith and sliding between the alternating washers 16 of the pile. The tendency of the bearing to shift laterally is thus impeded and the spindle is held more nearly in its proper vertical position.

The frictional opposition afforded by the washers 16 and 17 may obviously be increased or decreased by varying the number of the washers in the pile, or by the nature of the material of which they are composed, or by roughening the bearing faces.

As an instance of a modified construction in which my invention is embodied, I have shown in Fig. 2 a construction in which a socket member 18 is used without a sleeve or neck, such as 14, and with no intervening washers 16 and 17, but resting directly upon, and in frictional engagement with, the bottom of the stationary casing 15. Obviously the frictional opposition or braking effect in a construction of this sort is less than where washers such as 16 and 17 are interposed between the socket element and the casing. Nevertheless it may afford a sufficient braking action for the needs of certain machines. It is therefore to be understood that in the following claims I use the expression "friction means restraining lateral displacement" in a sense broad enough to include such a simple frictional engagement between the socket 13 and the casing as that shown in Fig. 2 without washers 16 and 17. My invention may be embodied in other modified forms of construction, and is not limited to the details shown in either of the figures.

I claim—

1. A bearing comprising a sliding member, apertured to permit the shaft to pass therethrough and having a spherical upper surface, a cooperating shaft-supporting member having a complementary spherical lower surface resting upon the upper surface of the sliding member, a fixed casing member for supporting the sliding member with limited freedom of lateral displacement therein to permit the sliding member to shift with respect to said casing on the tilting of the shaft with respect thereto.

2. A bearing comprising a socket member, apertured to permit the shaft to pass therethrough, a cooperating shaft-supporting member tiltable in said socket, a fixed casing member for supporting the socket with limited freedom of lateral displacement therein to permit the socket member to shift with respect to said casing on the tilting of the shaft with respect thereto, together with interengaging friction devices between said socket and casing to restrain the socket against lateral displacement.

3. A bearing comprising a socket member, apertured to permit the shaft to pass therethrough, a cooperating shaft-supporting member tiltable in said socket, a fixed casing member for supporting the socket with limited freedom of lateral displacement therein to permit the socket member to shift with respect to said casing on the tilting of the shaft with respect thereto, together with friction rings supported in immovable position by the casing, and interengaging rings moving with the socket and frictionally engaging the casing rings to restrain the socket against lateral displacement.

4. A bearing comprising a socket member, apertured to permit the shaft to pass therethrough, a cooperating shaft-supporting member tiltable in said socket, a fixed casing member for supporting the socket with limited freedom of lateral displacement therein to permit the socket member to shift with respect to said casing on the tilting of the shaft with respect thereto, said casing member being cup-shaped, together with a series of ring washers arranged freely in the lower portion of said casing and having a diameter substantially corresponding thereto, and a second series of ring washers of less diameter moving with the socket and interengaging between the ring washers of the casing, said socket member resting upon the washer group and transmitting thereto the weight imposed upon the bearing.

5. A bearing comprising a sliding member having a spherical upper surface and apertured to permit the shaft to pass therethrough, a cooperating shaft supporting member having a complementary spherical lower surface resting upon the upper surface of the sliding member, a fixed casing member for supporting the sliding member with limited freedom of lateral displacement therein to permit the sliding member to shift with respect to the said casing on the tilting of the shaft with respect thereto, and having a frictional engagement with the sliding member adapted to vary with the load imposed upon said sliding member.

6. A bearing comprising a sliding member having a spherical upper surface and apertured to permit the shaft to pass therethrough, a cooperating shaft supporting member having a complementary spherical lower surface resting upon the upper surface of the sliding member, a fixed casing member for supporting the sliding member with limited freedom of lateral displacement therein to permit the sliding member to shift with respect to the said casing on the tilting of the shaft with respect thereto, and having a frictional engagement with the sliding member adapted to vary with the load imposed upon said sliding member, together with a stationary ring associated with said shaft supporting member engaging the stationary casing at a point spaced from said sliding member to restrain the shaft supporting member from lateral displacement in the area of said ring, while permitting the sliding member to shift laterally and the lower portion of the shaft supporting member to oscillate with respect thereto.

7. A swingable bearing comprising a tiltable bearing member, a cooperating slidable socket member, a ring at the upper portion of the bearing restraining the latter against lateral displacement but permitting the lower portion of the bearing to swing, in combination with laterally fixed and laterally movable washers interengaged, and upon which the weight of the bearing is imposed, the movable washers being engaged by the socket member to move therewith.

In testimony whereof I have signed my name to this specification.

CHARLES A. OLCOTT.